United States Patent
Chan

(10) Patent No.: US 12,316,224 B2
(45) Date of Patent: May 27, 2025

(54) BOOST CONVERTER WITH FAST DISCHARGE FUNCTION

(71) Applicant: Acer Incorporated, New Taipei (TW)

(72) Inventor: Tzu-Tseng Chan, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 319 days.

(21) Appl. No.: 18/171,520

(22) Filed: Feb. 20, 2023

(65) Prior Publication Data

US 2024/0022171 A1     Jan. 18, 2024

(30) Foreign Application Priority Data

Jul. 18, 2022   (TW) .................................. 111126792

(51) Int. Cl.
| | | |
|---|---|---|
| *H02M 7/217* | (2006.01) | |
| *H02M 1/32* | (2007.01) | |
| *H02M 3/158* | (2006.01) | |
| *H02M 1/42* | (2007.01) | |
| *H02M 3/156* | (2006.01) | |

(52) U.S. Cl.
CPC .......... *H02M 3/158* (2013.01); *H02M 1/322* (2021.05); *H02M 1/4225* (2013.01); *H02M 3/156* (2013.01); *H02M 7/217* (2013.01)

(58) Field of Classification Search
CPC .... H02M 1/322; H02M 1/4225; H02M 3/156; H02M 3/158; H02M 7/217
See application file for complete search history.

(56) References Cited

U.S. PATENT DOCUMENTS

| | | | | |
|---|---|---|---|---|
| 4,868,730 A | * | 9/1989 | Ward | ................ H02M 3/33569 323/224 |
| 6,801,019 B2 | * | 10/2004 | Haydock | ................. H02J 9/066 322/17 |
| 11,764,767 B1 | * | 9/2023 | Pang | ........................ H03K 4/48 327/306 |

* cited by examiner

*Primary Examiner* — Gary L Laxton
(74) *Attorney, Agent, or Firm* — McClure, Qualey & Rodack, LLP

(57) ABSTRACT

A boost converter with the fast discharge function includes a bridge rectifier, a boost inductor, a power switch element, an output stage circuit, a detection and control circuit, a discharge circuit, and an MCU (Microcontroller Unit). The bridge rectifier generates a rectified voltage according to a first input voltage and a second input voltage. The boost inductor receives the rectified voltage. The power switch element selectively couples the boost inductor to a ground voltage according to a clock voltage. The output stage circuit is coupled to the boost inductor, and is configured to generate an output voltage. The detection and control circuit generates a control voltage according to the rectified voltage and the output voltage. The discharge circuit is coupled to the output stage circuit. The MCU generates the clock voltage. The MCU selectively enables or disables the discharge circuit according to the control voltage.

15 Claims, 3 Drawing Sheets

US 12,316,224 B2

BOOST CONVERTER WITH FAST DISCHARGE FUNCTION

CROSS REFERENCE TO RELATED APPLICATIONS

This application claims priority of Taiwan Patent Application No. 111126792 filed on Jul. 18, 2022, the entirety of which is incorporated by reference herein.

BACKGROUND OF THE INVENTION

Field of the Invention

The disclosure generally relates to a boost converter, and more specifically, to a boost converter for fast discharge.

Description of the Related Art

The output capacitors used in conventional boost converters usually have a relatively large capacitance. Even if the external input power source of the boost converter is removed, the output capacitor can continue to provide electric power for a period of time. All too easily, however, the corresponding system can switch to the wrong mode, or experience other misjudgments. Accordingly, there is a need to propose a novel solution for solving this problem of the prior art.

BRIEF SUMMARY OF THE INVENTION

In an exemplary embodiment, the invention is directed to a boost converter with the fast discharge function. The boost converter includes a bridge rectifier, a boost inductor, a power switch element, an output stage circuit, a detection and control circuit, a discharge circuit, and an MCU (Microcontroller Unit). The bridge rectifier generates a rectified voltage according to a first input voltage and a second input voltage. The boost inductor receives the rectified voltage. The power switch element selectively couples the boost inductor to a ground voltage according to a clock voltage. The output stage circuit is coupled to the boost inductor, and is configured to generate an output voltage. The detection and control circuit generates a control voltage according to the rectified voltage and the output voltage. The discharge circuit is coupled to the output stage circuit. The MCU generates the clock voltage. The MCU selectively enables or disables the discharge circuit according to the control voltage.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

In order to illustrate the purposes, features and advantages of the invention, the embodiments and figures of the invention are described in detail below.

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". The term "substantially" means the value is within an acceptable error range. One skilled in the art can solve the technical problem within a predetermined error range and achieve the proposed technical performance. Also, the term "couple" is intended to mean either an indirect or direct electrical connection. Accordingly, if one device is coupled to another device, that connection may be through a direct electrical connection, or through an indirect electrical connection via other devices and connections.

Figure 1:
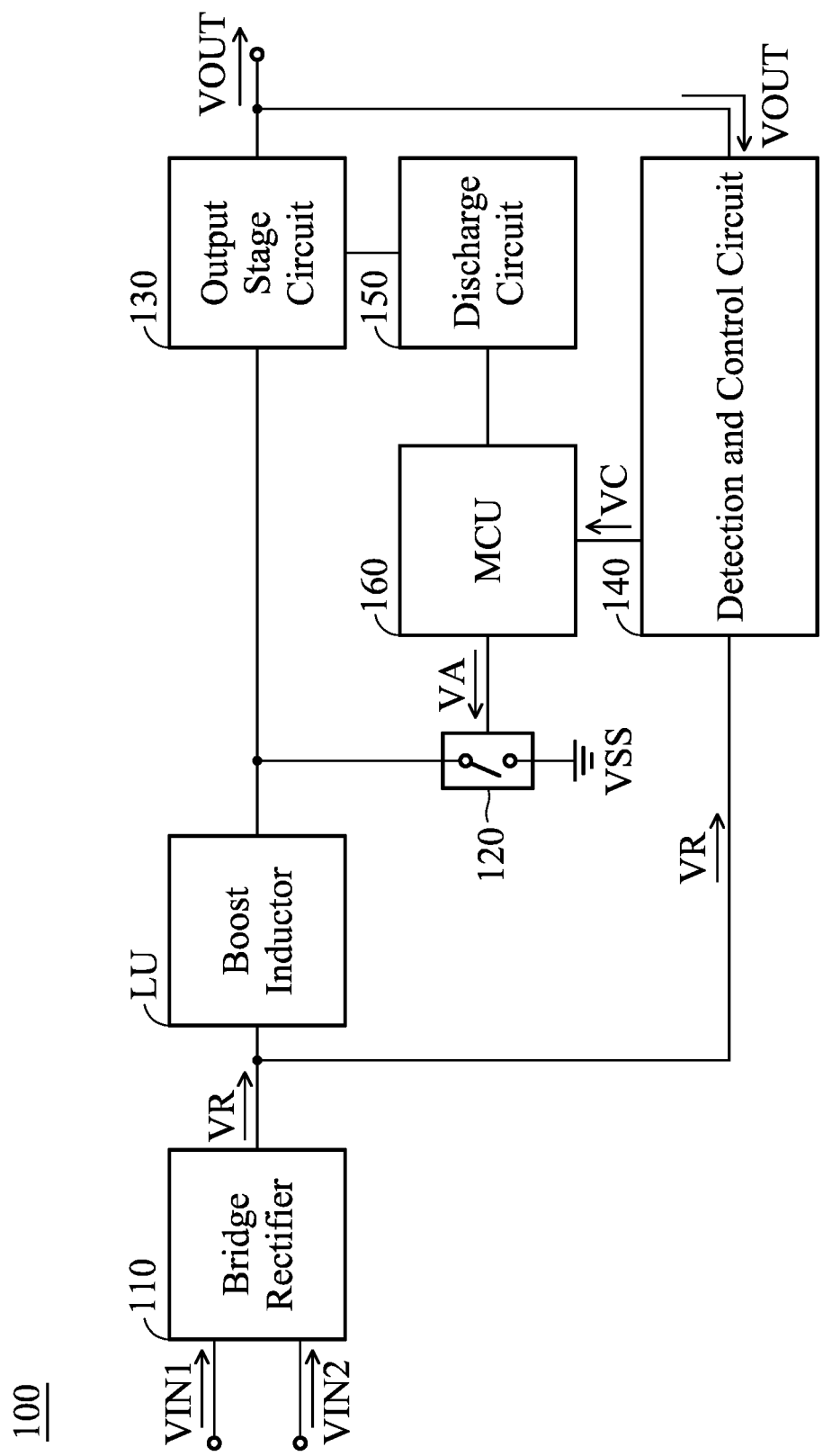
FIG. 1 is a diagram of a boost converter according to an embodiment of the invention.

FIG. 1 is a diagram of a boost converter 100 according to an embodiment of the invention. For example, the boost converter 100 may be applied to a desktop computer, a notebook computer, or an all-in-one computer. As shown in FIG. 1, the boost converter 100 includes a bridge rectifier 110, a boost inductor LU, a power switch element 120, an output stage circuit 130, a detection and control circuit 140, a discharge circuit 150, and an MCU (Microcontroller Unit) 160. It should be noted that the boost converter 100 may further include other components, such as a voltage regulator and/or a negative feedback circuit, although they are not displayed in FIG. 1.

The bridge rectifier 110 generates a rectified voltage VR according to a first input voltage VIN1 and a second input voltage VIN2. An AC (Alternating Current) voltage difference with any frequency and any magnitude may be formed between the first input voltage VIN1 and the second input voltage VIN2. For example, the frequency of the AC voltage difference may be about 50 Hz or 60 Hz, and the RMS (Root-Mean-Square) value of the AC voltage difference may be from about 90V to 264V, but they are not limited thereto. The boost inductor LU receives the rectified voltage VR. The power switch element 120 selectively couples the boost inductor LU to a ground voltage VSS (e.g., 0V) according to a clock voltage VA. For example, if the clock voltage VA has a high logic level, the power switch element 120 may couple the boost inductor LU to the ground voltage VSS (i.e., the power switch element 120 is similar to a short-circuited path). Conversely, if the clock voltage VA has a low logic level, the power switch element 120 may not couple the boost inductor LU to the ground voltage VSS (i.e., the power switch element 120 is similar to an open-circuited path). The output stage circuit 130 is coupled to the boost inductor LU, and is configured to generate an output voltage VOUT. For example, the output voltage VOUT may be an DC (Direct Current) voltage, whose voltage level may be from 360V to 440V, but it is not limited thereto. The detection and control circuit 140 generates a control voltage VC according to the rectified voltage VR and the output voltage VOUT. The discharge circuit 150 is coupled to the output stage circuit 130. The MCU 160 generates the clock voltage VA. The MCU 160 can selectively enable or disable the discharge circuit 150 according to the control voltage VC. In some embodiments, when the discharge circuit 150 is enabled, the discharge circuit 150 and the MCU 160 can perform a fixed-power discharging process on the output stage circuit 130. With such a design, the boost converter 100 can determine whether its external input power source is removed by analyzing the control voltage VC, and then selectively perform a corresponding fast discharging process, so as to effectively enhance the whole reliability and stability.

The following embodiments will introduce the detailed structure and operation of the boost converter 100. It should be understood these figures and descriptions are merely exemplary, rather than limitations of the invention.

Figure 2:
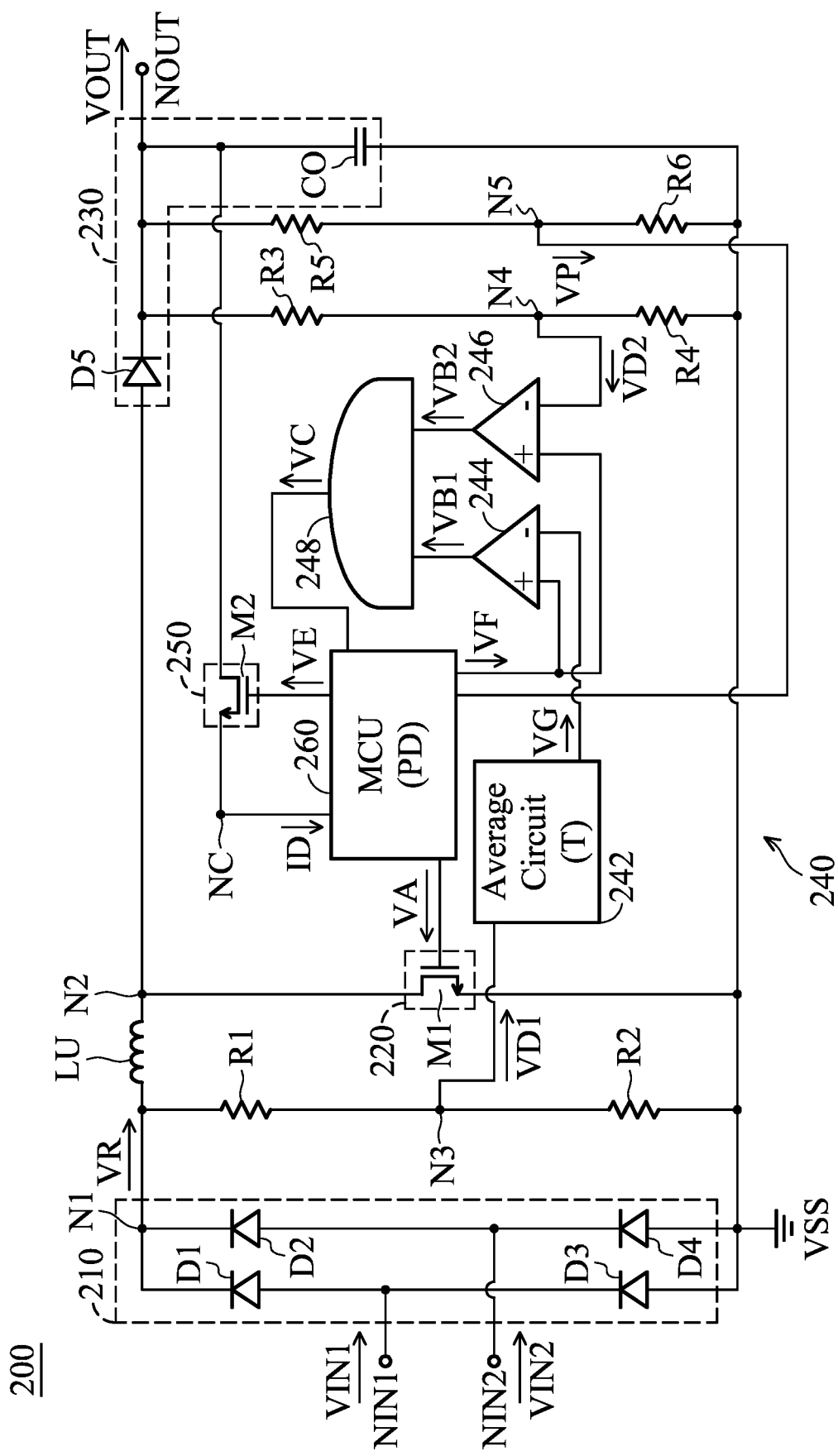
FIG. 2 is a diagram of the circuitry of a boost converter according to an embodiment of the invention.

FIG. 2 is a diagram of the circuitry of a boost converter 200 according to an embodiment of the invention. In the embodiment of FIG. 2, the boost converter 200 with a first input node NIN1, a second input node NIN2 and an output node NOUT includes a bridge rectifier 210, a boost inductor LU, a power switch element 220, an output stage circuit 230, a detection and control circuit 240, a discharge circuit 250, and an MCU 260. The first input node NIN1 and the second input node NIN2 of the boost converter 200 are arranged for receiving a first input voltage VIN1 and a second input voltage VIN2 from an external input power source (not shown), respectively. The output node NOUT of the boost converter 200 is arranged for outputting an output voltage VOUT to an electronic device (not shown).

The bridge rectifier 210 includes a first diode D1, a second diode D2, a third diode D3, and a fourth diode D4. The first diode D1 has an anode coupled to the first input node NIN1, and a cathode coupled to a first node N1 for outputting a rectified voltage VR. The second diode D2 has an anode coupled to the second input node NIN2, and a cathode coupled to the first node N1. The third diode D3 has an anode coupled to a ground voltage VSS, and a cathode coupled to the first input node NIN1. The fourth diode D4 has an anode coupled to the ground voltage VSS, and a cathode coupled to the second input node NIN2.

The boost inductor LU has a first terminal coupled to the first node N1 for receiving the rectified voltage VR, and a second terminal coupled to a second node N2.

The power switch element 220 includes a first transistor M1. For example, the first transistor M1 may be an NMOSFET (N-type Metal Oxide Semiconductor Field Effect Transistor). The first transistor M1 has a control terminal (e.g., a gate) for receiving a clock voltage VA, a first terminal (e.g., a source) coupled to the ground voltage VSS, and a second terminal (e.g., a drain) coupled to the second node N2.

The output stage circuit 230 includes a fifth diode D5 and an output capacitor CO. The fifth diode D5 has an anode coupled to the second node N2, and a cathode coupled to the output node NOUT. The output capacitor CO has a first terminal coupled to the output node NOUT, and a second terminal coupled to the ground voltage VSS.

The detection and control circuit 240 includes an average circuit 242, a first comparator 244, a second comparator 246, an AND gate 248, a first resistor R1, a second resistor R2, a third resistor R3, a fourth resistor R4, a fifth resistor R5, and a sixth resistor R6.

The first resistor R1 has a first terminal coupled to the first node N1 for receiving the rectified voltage VR, and a second terminal coupled to a third node N3 for outputting a first divided voltage VD1. The second resistor R2 has a first terminal coupled to the third node N3, and a second terminal coupled to the ground voltage VSS. The average circuit 242 can generate an average voltage VG according to the first divided voltage VD1. For example, the average voltage VG may be an average value of the first divided voltage VD1 within a period of predetermined time T. In some embodiments, the first divided voltage VD1 and the average voltage VG will be described as the following equations (1) and (2):

$$VD1 = \left(\frac{R2}{R1+R2}\right) \cdot VR \quad (1)$$

$$VG = \frac{1}{T}\int_0^T (VD1) \cdot dt \quad (2)$$

where "VD1" represents the first divided voltage VD1, "VR" represents the rectified voltage VR, "VG" represents the average voltage VG, "R1" represents the resistance of the first resistor R1, "R2" represents the resistance of the second resistor R2, and "T" represents the predetermined time T.

The third resistor R3 has a first terminal coupled to the output node NOUT for receiving the output voltage VOUT, and a second terminal coupled to a fourth node N4 for outputting a second divided voltage VD2. The fourth resistor R4 has a first terminal coupled to the fourth node N4, and a second terminal coupled to the ground voltage VSS. In some embodiments, the second divided voltage VD2 will be described as the following equation (3):

$$VD2 = \left(\frac{R4}{R3+R4}\right) \cdot VOUT \quad (3)$$

where "VD2" represents the second divided voltage VD2, "VOUT" represents the output voltage VOUT, "R3" represents the resistance of the third resistor R3, and "R4" represents the resistance of the fourth resistor R4.

The fifth resistor R5 has a first terminal coupled to the output node NOUT for receiving the output voltage VOUT, and a second terminal coupled to a fifth node N5 for outputting a supply voltage VP. The sixth resistor R6 has a first terminal coupled to the fifth node N5, and a second terminal coupled to the ground voltage VSS. It should be noted that the MCU 260 is supplied by the supply voltage VP. In some embodiments, the supply voltage VP will be described as the following equation (4):

$$VP = \left(\frac{R6}{R5+R6}\right) \cdot VOUT \quad (4)$$

where "VP" represents the supply voltage VP, "VOUT" represents the output voltage VOUT, "R5" represents the resistance of the fifth resistor R5, and "R6" represents the resistance of the sixth resistor R6.

The first comparator 244 has a positive input terminal for receiving a reference voltage VF, a negative input terminal for receiving the average voltage VG, and an output terminal for outputting a first comparison voltage VB1. For example, if the reference voltage VF is higher than or equal to the average voltage VG, the first comparator 244 will output the first comparison voltage VB1 with a high logic level. Conversely, if the reference voltage VF is lower than the average voltage VG, the first comparator 244 will output the first comparison voltage VB1 with a low logic level.

The second comparator 246 has a positive input terminal for receiving the reference voltage VF, a negative input terminal for receiving the second divided voltage VD2, and an output terminal for outputting a second comparison voltage VB2. For example, if the reference voltage VF is higher than or equal to the second divided voltage VD2, the second comparator 246 will output the second comparison voltage VB2 with a high logic level. Conversely, if the reference voltage VF is lower than the second divided voltage VD2, the second comparator 246 will output the second comparison voltage VB2 with a low logic level.

The AND gate 248 has a first input terminal for receiving the first comparison voltage VB1, a second input terminal for receiving the second comparison voltage VB2, and an output terminal for outputting the control voltage VC. For example, only if both the first comparison voltage VB1 and the second comparison voltage VB2 have high logic levels, the AND gate 248 will output the control voltage VC with a high logic level. Conversely, if any of the first comparison voltage VB1 and the second comparison voltage VB2 has a low logic level, the AND gate 248 will output the control voltage VC with a low logic level.

The discharge circuit 250 includes a second transistor M2. For example, the second transistor M2 may be another NMOSFET. The second transistor M2 has a control terminal (e.g., a gate) for receiving an operational voltage VE, a first terminal (e.g., a source) coupled to a control node NC, and a second terminal (e.g., a drain) coupled to the output node NOUT.

The MCU 260 can provide the clock voltage VA and the reference voltage VF. For example, the clock voltage VA may be maintained at a fixed voltage level when the boost converter 200 is initialized, and the clock voltage VA may provide a periodical clock waveform after the boost converter 200 is normally operated. Furthermore, the reference voltage VF may be set to a fixed value according to practical requirements.

The MCU 260 can generate the operational voltage VE according to the control voltage VC. When the control voltage VC has a high logic level, the MCU 260 can output the operational voltage VE with a high logic level for enabling the second transistor M2, and draw a discharge current ID from the control node NC. For example, the current magnitude of the discharge current ID may be variable, and it may be inversely proportional to the voltage level of the output voltage VOUT. It should be understood that the MCU 260 can obtain the relative information of the output voltage VOUT by analyzing the supply voltage VP. In some embodiments, when the second transistor M2 is enabled, the output capacitor CO can be discharged based on a constant discharging power PD, which will be described as the following equation (5):

$$PD = VOUT \cdot ID \qquad (5)$$

where "PD" represents the discharging power PD, "VOUT" represents the output voltage VOUT, and "ID" represents the discharge current ID.

On the contrary, when the control voltage VC has a low logic level, the MCU 260 can output the operational voltage VE with a low logic level for disabling the second transistor M2. At this time, the discharge current ID may be substantially kept at 0.

Figure 3:
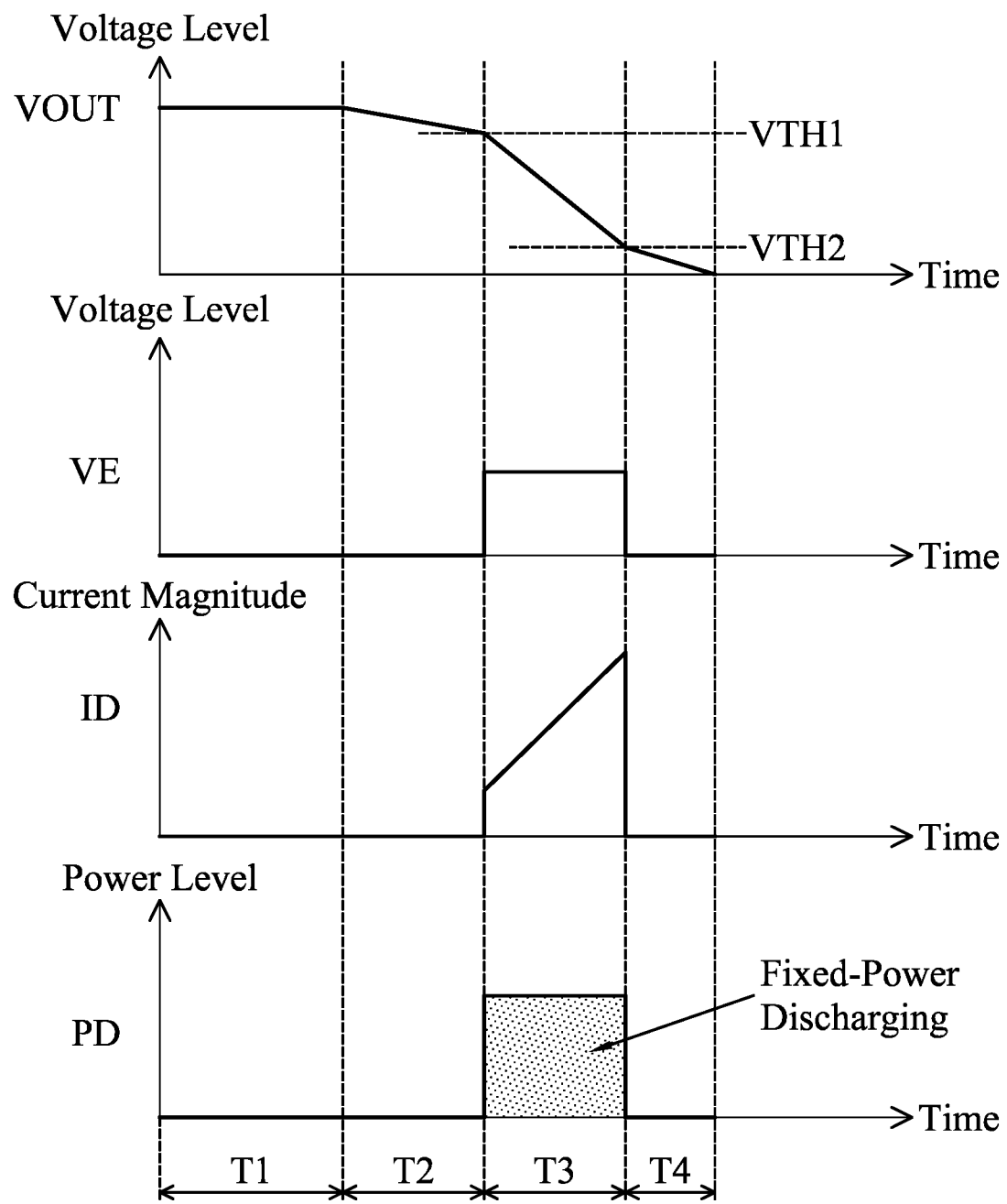
FIG. 3 is a diagram of signal waveforms of a boost converter according to an embodiment of the invention.

FIG. 3 is a diagram of signal waveforms of the boost converter 200 according to an embodiment of the invention. After the corresponding external input power source is removed, the boost converter 200 may be sequentially operated in a first stage T1, a second stage T2, a third stage T3, and a fourth stage T4. Their operational principles will be described as follows.

During the first stage T1, since the external input power source is just removed, the output voltage VOUT of the output capacitor CO may be temporarily kept unchanged.

During the second stage T2, the output voltage VOUT of the output capacitor CO may gradually become lower due to the natural discharging effect. When the output voltage VOUT is reduced to a first threshold value VTH1, the boost converter 200 leaves the second stage T2 and enters the third stage T3. For example, the first threshold value VTH1 may be equal to 95% of the maximum value of the output voltage VOUT, and the reference voltage VF of the MCU 260 may be correspondingly set according to the first threshold value VTH1.

It should be understood that if the output voltage VOUT is lower than the first threshold value VTH1, the second divided voltage VD2 will also be lower than the reference voltage VF. Thus, the second comparison voltage VB2 has a high logic level. In addition, since the external input power source is removed and the rectified voltage VR is lower than the reference voltage VF, the first comparison voltage VB1 also has a high logic level. As a result, during the third stage T3, both the control voltage VC and the operational voltage VE have high logic levels.

During the third stage T3, the discharge circuit 250 is enabled, and the MCU 260 uses the discharge circuit 250 to perform a fixed-power discharging process on the output capacitor CO. In other words, if the output voltage VOUT gradually decreases, the discharge current ID will gradually increase, such that the discharging power PD of the MCU 260 can be substantially maintained at a constant value. In some embodiments, if the discharging power PD is fixed to 5 W, the relationship between the output voltage VOUT and the discharge current ID will be described as following Table I:

TABLE I

Relationship Between Output Voltage VOUT and Discharge Current ID

| Output Voltage VOUT | Discharge Current ID |
|---|---|
| 380 V | 13.16 mA |
| 340 V | 14.70 mA |
| 300 V | 16.67 mA |
| 260 V | 19.23 mA |
| 220 V | 22.72 mA |
| 180 V | 27.78 mA |
| 140 V | 35.71 mA |
| 100 V | 50.00 mA |
| 65 V | 76.92 mA |

With such a design, because the discharge current ID gradually increases, the discharging efficiency of the output capacitor CO can be significantly improved. Therefore, the proposed boost converter 200 can effectively solve the problem of too long a discharging time in a conventional design.

When the output voltage VOUT is reduced to a second threshold voltage VTH2, the boost converter 200 leaves the third stage T3 and enters the fourth stage T4. For example, the second threshold voltage VTH2 may correspond to the UVLO (Under Voltage Lock Out) of the MCU 260. During the fourth stage T4, the MCU 260 is turned off, and the output voltage VOUT is gradually reduced to 0 due to the natural discharge effect.

The invention proposes a novel boost converter with the function of fast discharge. According to practical measurements, the boost converter using the aforementioned design can effectively improve the whole stability and reliability, and therefore it is suitable for application in a variety of devices.

Note that the above voltages, currents, resistances, inductances, capacitances and other element parameters are not limitations of the invention. A designer can adjust these settings according to different requirements. The boost converter of the invention is not limited to the configurations of FIGS. 1-3. The invention may merely include any one or more features of any one or more embodiments of FIGS. 1-3. In other words, not all of the features displayed in the figures should be implemented in the boost converter of the invention. Although the embodiments of the invention use MOSFET as examples, the invention is not limited thereto, and those skilled in the art may use other types of transistors, such as BJT (Bipolar Junction Transistor), JFET (Junction Gate Field Effect Transistor), FinFET (Fin Field Effect Transistor), etc., without affecting the performance of the invention.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

It will be apparent to those skilled in the art that various modifications and variations can be made in the invention. It is intended that the standard and examples be considered exemplary only, with the true scope of the disclosed embodiments being indicated by the following claims and their equivalents.

What is claimed is:

1. A boost converter with a fast discharge function, comprising:
    a bridge rectifier, generating a rectified voltage according to a first input voltage and a second input voltage;
    a boost inductor, receiving the rectified voltage;
    a power switch element, selectively coupling the boost inductor to a ground voltage according to a clock voltage;
    an output stage circuit, coupled to the boost inductor, and generating an output voltage;
    a detection and control circuit, generating a control voltage according to the rectified voltage and the output voltage;
    a discharge circuit, coupled to the output stage circuit; and
    an MCU (Microcontroller Unit), generating the clock voltage, wherein the MCU selectively enables or disables the discharge circuit according to the control voltage.

2. The boost converter as claimed in claim 1, wherein when the discharge circuit is enabled, the discharge circuit and the MCU perform a fixed-power discharging process on the output stage circuit.

3. The boost converter as claimed in claim 1, wherein the bridge rectifier comprises:
    a first diode, wherein the first diode has an anode coupled to a first input node for receiving the first input voltage, and a cathode coupled to a first node for outputting the rectified voltage;
    a second diode, wherein the second diode has an anode coupled to a second input node for receiving the second input voltage, and a cathode coupled to the first node;
    a third diode, wherein the third diode has an anode coupled to the ground voltage, and a cathode coupled to the first input node; and
    a fourth diode, wherein the fourth diode has an anode coupled to the ground voltage, and a cathode coupled to the second input node.

4. The boost converter as claimed in claim 3, wherein the boost inductor has a first terminal coupled to the first node for receiving the rectified voltage, and a second terminal coupled to a second node.

5. The boost converter as claimed in claim 4, wherein the power switch element comprises:
    a first transistor, wherein the first transistor has a control terminal for receiving the clock voltage, a first terminal coupled to the ground voltage, and a second terminal coupled to the second node.

6. The boost converter as claimed in claim 4, wherein the output stage circuit comprises:
    a fifth diode, wherein the fifth diode has an anode coupled to the second node, and a cathode coupled to an output node for outputting the output voltage; and
    an output capacitor, wherein the output capacitor has a first terminal coupled to the output node, and a second terminal coupled to the ground voltage.

7. The boost converter as claimed in claim 6, wherein the detection and control circuit comprises:
    a first resistor, wherein the first resistor has a first terminal coupled to the first node for receiving the rectified voltage, and a second terminal coupled to a third node for outputting a first divided voltage; and
    a second resistor, wherein the second resistor has a first terminal coupled to the third node, and a second terminal coupled to the ground voltage.

8. The boost converter as claimed in claim 7, wherein the detection and control circuit further comprises:
    an average circuit, generating an average voltage according to the first divided voltage.

9. The boost converter as claimed in claim 8, wherein the detection and control circuit further comprises:
    a third resistor, wherein the third resistor has a first terminal coupled to the output node for receiving the output voltage, and a second terminal coupled to a fourth node for outputting a second divided voltage; and
    a fourth resistor, wherein the fourth resistor has a first terminal coupled to the fourth node, and a second terminal coupled to the ground voltage.

10. The boost converter as claimed in claim 9, wherein the detection and control circuit further comprises:
    a fifth resistor, wherein the fifth resistor has a first terminal coupled to the output node for receiving the output voltage, and a second terminal coupled to a fifth node for outputting a supply voltage; and
    a sixth resistor, wherein the sixth resistor has a first terminal coupled to the fifth node, and a second terminal coupled to the ground voltage;
    wherein the MCU is supplied by the supply voltage.

11. The boost converter as claimed in claim 10, wherein the detection and control circuit further comprises:
    a first comparator, wherein the first comparator has a positive input terminal for receiving a reference voltage, a negative input terminal for receiving the average voltage, and an output terminal for outputting a first comparison voltage.

12. The boost converter as claimed in claim 11, wherein the detection and control circuit further comprises:
    a second comparator, wherein the second comparator has a positive input terminal for receiving the reference voltage, a negative input terminal for receiving the second divided voltage, and an output terminal for outputting a second comparison voltage.

13. The boost converter as claimed in claim 12, wherein the detection and control circuit further comprises:

an AND gate, wherein the AND gate has a first input terminal for receiving the first comparison voltage, a second input terminal for receiving the second comparison voltage, and an output terminal for outputting the control voltage.

14. The boost converter as claimed in claim 13, wherein the discharge circuit comprises:
a second transistor, wherein the second transistor has a control terminal for receiving an operational voltage, a first terminal coupled to a control node, and a second terminal coupled to the output node.

15. The boost converter as claimed in claim 14, wherein the MCU provides the reference voltage, and when the control voltage has a high logic level, the MCU outputs the operational voltage with the high logic level and draws a discharge current from the control node.

* * * * *